United States Patent
Lee et al.

(10) Patent No.: US 7,787,315 B2
(45) Date of Patent: Aug. 31, 2010

(54) SEMICONDUCTOR DEVICE AND METHOD FOR DETECTING ABNORMAL OPERATION

(75) Inventors: Tae-Hun Lee, Hwaseong-si (KR); Jung Hyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 212 days.

(21) Appl. No.: 12/132,371

(22) Filed: Jun. 3, 2008

(65) Prior Publication Data

US 2009/0013415 A1 Jan. 8, 2009

(30) Foreign Application Priority Data

Jun. 22, 2007 (KR) ............ 2007-0061706

(51) Int. Cl.
*G11C 7/00* (2006.01)
(52) U.S. Cl. ............. 365/189.11; 365/189.05; 365/109
(58) Field of Classification Search ........... 365/189.11, 365/189.05, 109; 348/308
See application file for complete search history.

(56) References Cited

U.S. PATENT DOCUMENTS

| | | |
|---|---|---|
| 7,015,821 B2 | 3/2006 | Gamperl et al. |
| 2004/0201761 A1* | 10/2004 | Mentzer ............... 348/308 |
| 2006/0044414 A1* | 3/2006 | Lee et al. ............ 348/230.1 |
| 2006/0256220 A1* | 11/2006 | Rysinski et al. ........ 348/308 |
| 2007/0040922 A1* | 2/2007 | McKee et al. ......... 348/308 |

FOREIGN PATENT DOCUMENTS

| | | |
|---|---|---|
| JP | 10-320293 | 12/1998 |
| JP | 2004-206680 | 7/2004 |
| KR | 2003-0066858 | 8/2003 |
| KR | 1020040049117 | 6/2004 |
| KR | 10-2005-0066558 | 6/2005 |

OTHER PUBLICATIONS

Korean Office Action dated Nov. 13, 2008 for corresponding Korean Application No. 10-2007-0061706.

* cited by examiner

*Primary Examiner*—Son Dinh
(74) *Attorney, Agent, or Firm*—F. Chau & Associates, LLC

(57) ABSTRACT

A semiconductor device includes a pull-up unit pulling up a voltage of an output node to a first voltage in response to a control signal, a photo sensing unit pulling down a voltage of the output node to a second voltage in response to an incident light, and a CPU, the CPU reset in response to the voltage of the output node produced in response to the incident light.

19 Claims, 6 Drawing Sheets

SEMICONDUCTOR DEVICE AND METHOD FOR DETECTING ABNORMAL OPERATION

CROSS-REFERENCE TO RELATED APPLICATION

This application claims priority under 35 U.S.C. §119 from Korean Patent Application No. 2007-0061706 filed on Jun. 22, 2007, the disclosure of which is incorporated by reference herein.

BACKGROUND OF THE INVENTION

1. Technical Field

The present invention relates to a semiconductor device, and more particularly, to a semiconductor device detecting an abnormal operation such as a hacking attempt and a method thereof.

2. Discussion of the Related Art

A memory card is widely used in a small electronic device such as a digital camera, a PDA, or a mobile communication device, as it is a device capable of storing data. The memory card includes a non-volatile memory such as a flash EEPROM. The memory card has various shapes and sizes such as a smart card, a multi media card MMC, a secure digital SD card, or a xD-picture card, for example, and may store multiple types of data representing a picture, a document, music, a program, etc. All memory cards essentially have the same function of storing data.

Because the memory card is portable, it can be embedded in a credit card, a mobile communication device, or used in financial transactions, etc., according to stored information. The stored information can be biographical information, financial information, or authentication information. When stored data which requires to be secured are accessed, copied, forged, or otherwise compromised, the user can be placed at great risk of identity theft and financial loss. Therefore, securing the data is important.

One of the methods for improperly accessing (hacking) data stored in a memory card is breaching a protective film, e.g., a silicon dioxide film (SiO2), covering the surface of a chip of the memory card, and monitoring a metal line exposed to the surface of the chip by using an oscilloscope.

The memory card may include a plurality of photo sensing elements in a chip as a method for sensing an abnormal operation such as a hacking attempt. When a protective film of the chip inside the memory card is breached for improper purposes, the plurality of photo sensing elements may sense an abnormal operation by outputting a control signal in response to an incident light. A central processing unit (CPU) may be reset in response to the control signal. Accordingly, data stored in a memory may be protected.

Because the size of a photo sensing cell is big, it may be difficult to place a number of photo sensing cells in the memory card, or the photo sensing cell may not be properly positioned within the chip of a memory card. Accordingly, the memory card may not reliably protect data as it can sense an abnormal operation only in a specific area proximal to the photo sensing cell.

Also, the photo sensing cell may not sense an abnormal operation when an incident light is less intense than a level which the photo sensing cell may sense. Accordingly to properly secure a memory card, the memory card may need to have metal covering most or all parts of the chip.

A need therefore exists for a sensing part capable of sensing an abnormal operation of a memory chip, and a method for protecting data capable of sensing an abnormal operation in any operational environment and during any operation is required.

SUMMARY OF THE INVENTION

An exemplary embodiment of the present invention is directed to a semiconductor device, including a pull-up unit, which is connected between a first node receiving a first voltage and an output node and pulls-up a voltage of the output node to the first voltage in response to a control signal, and a photo sensing unit, which is connected between the output node and a second node receiving a second voltage and pulls-down a voltage of the output node to the second voltage in response to an incident light.

The semiconductor device may further include a CPU, which is reset in response to the voltage of the output node generated in response to the incident light.

The semiconductor device may further include a latch, which is reset in response to the voltage of the output node generated in response to the incident light and latches the first voltage state in response to a clock signal, and a CPU reset in response to a voltage output from the latch.

The semiconductor device may further include a memory storing data, and a controller controlling an operation of the memory. The control signal is output from the controller and can be a memory access signal accessing the memory.

The semiconductor device may further include a pulse generator generating the control signal, which is a periodic pulse.

The pull-up unit may include a MOS transistor connected between the first node and the output node, and a gate of the MOS transistor receives the control signal and may be connected to one of the first node and the second node.

The photo sensing unit may further include a plurality of photo sensing elements connected between the output node and the second node via a plurality of switches, and the plurality of the switches respectively can be turned on/off in response to a corresponding switch control signal among a plurality of switch control signals.

Another example embodiment of the present invention is directed to a CPU reset method, including pulling-up a level of a photo sensing signal to a first voltage level in response to a control signal, pulling-down a level of a photo sensing signal to a second voltage level, which is lower than the first voltage level, in response to an incident light, and resetting a CPU in response to the photo sensing signal having the second voltage level.

The control signal may be a memory access signal accessing the memory signal. The control signal may also be a periodic pulse signal.

BRIEF DESCRIPTION OF THE DRAWINGS

Exemplary embodiments of the present invention will become apparent by reference to the following detailed description taken in conjunction with the accompanying drawings, wherein.

DETAILED DESCRIPTION OF EXEMPLARY EMBODIMENTS

Figure 1:
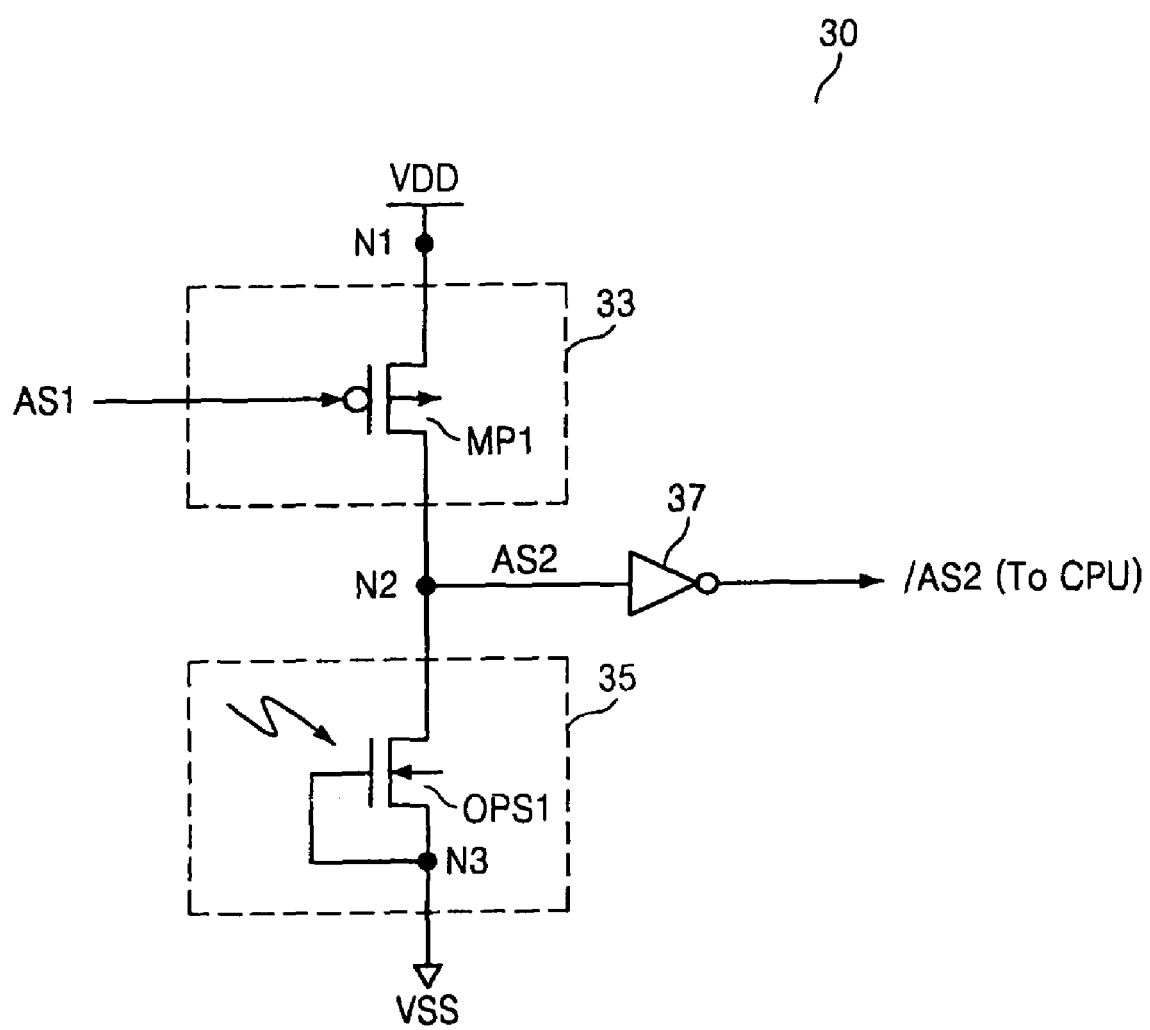
FIG. 1 is a circuit diagram of a photo sensing cell, according to an exemplary embodiment of the present invention.

Hereinafter, exemplary embodiments of the present invention will be described in detail with reference to the accompanying drawings, wherein like reference numerals refer to like elements throughout.

FIG. 1 is a circuit diagram of a photo sensing cell 30 according to an exemplary embodiment of the present invention. Referring to FIG. 1, a photo sensing (or photo sensitive) cell 30 includes a pull-up unit 33 and a photo sensing (or photo sensitive) unit 35.

The pull-up unit 33 includes a transistor MP1 performing a switching function, and the transistor MP1 is connected between a first node N1 receiving a first voltage VDD and an output node N2. The pull-up unit 33 pulls up (or pre-charges) a voltage of the output node N2 to the first voltage VDD by forming a current channel between the first node N1 and the output node N2 in response to a control signal AS1.

When the output node N2 of the photo sensing cell 30 is pulled-up to the first voltage VDD, a photo sensing unit 35 may start detecting an abnormal operation, e.g., an illegal attack or hacking. The transistor MP1 may be embodied as a PMOS transistor or a NMOS transistor.

The photo sensing unit 35 includes a photo sensing element OPS1 capable of performing photoelectric conversion such as a photodiode or a phototransistor, and the photo sensing element OPS1 is connected between the output node N2 and a second voltage VSS, e.g., a second node N3 receiving a ground voltage. The photo sensing element OPS1 turns on in response to an incident light, and pulls-down a voltage of the output node N2 to the second voltage VSS by forming a current channel between the output node N2 and the second node N3. That is, when the photo sensing element OPS1 senses an abnormal operation, e.g., an incident light perceived from outside for hacking, a voltage AS2 of the output node N2 pulled up to the first voltage VDD is pulled-down to the second voltage VSS by the photo sensing element OPS1.

The photo sensing cell 30 may further include an inverter 37 inverting the voltage AS2 of the output node N2. That is, the voltage AS2 of the output node N2 and an output voltage /AS2 of the inverter 37 perform the function of a photo sensing signal.

When the photo sensing cell 30 is embodied in a part of a memory card, the voltage AS2 of the output node N2 or the voltage /AS2 of the inverter 37 may be supplied to a CPU (not shown) controlling the operation of the memory card. The CPU can be reset in response to the photo sensing signal AS2 or /AS2. Therefore, data stored in a memory (not shown) of the memory card requiring security can be protected.

Figure 2:
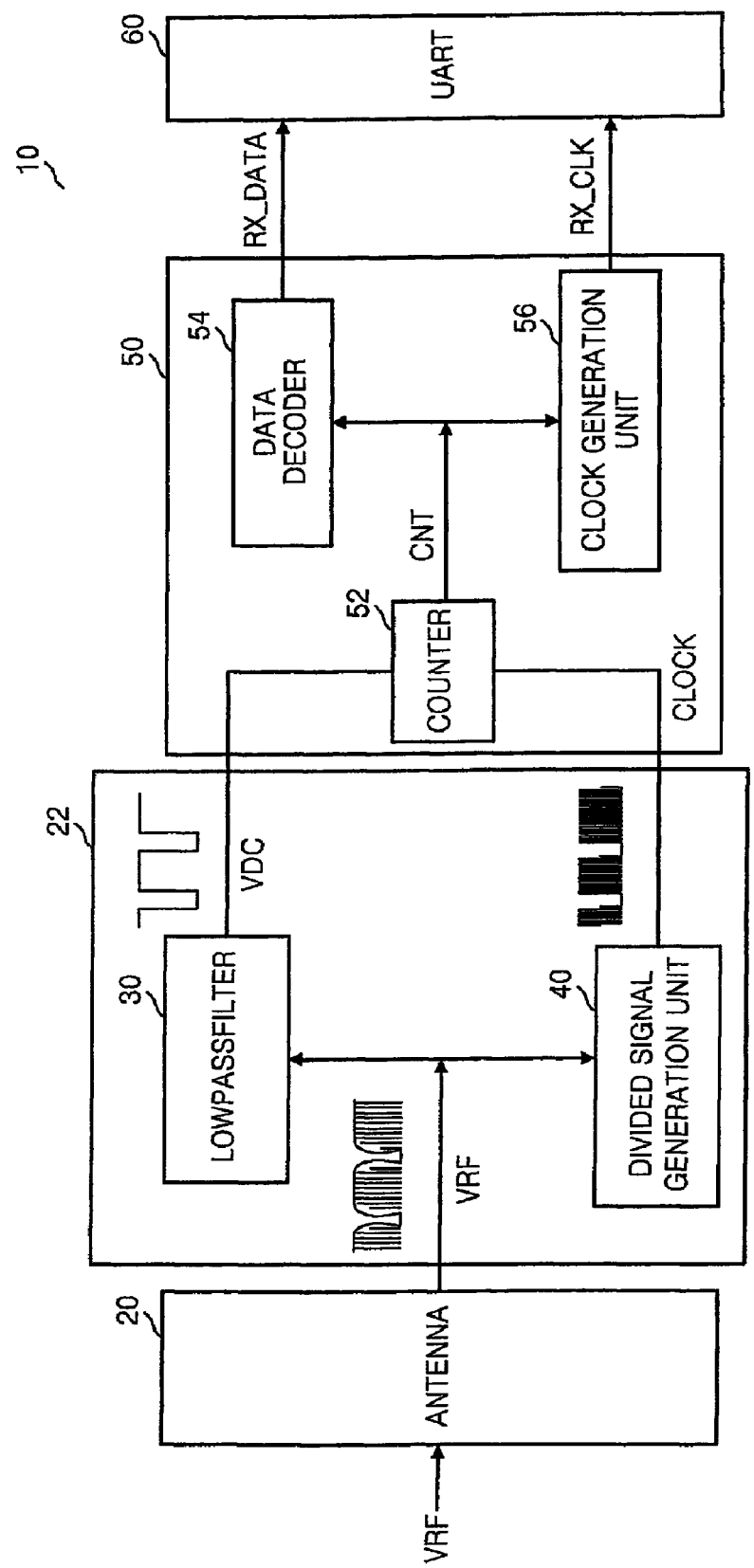
FIG. 2 is a system block diagram including the photo sensing cell illustrated in FIG. 1 and a peripheral circuit, according to an exemplary embodiment of the present invention.

FIG. 2 is a system block diagram including the photo sensing cell 30 illustrated in FIG. 1 and a peripheral circuit. Referring to FIG. 2, a system such as a memory card, requiring security, includes a controller 11, a plurality of memories 13, 15, and 17, a logic circuit 19, and a photo sensing cell 30.

Whenever the controller 11 performs an operation of exchanging data, e.g., a writing operation or a reading operation, with at least one of a plurality of memories 13, 15, and 17, the controller 11 outputs a memory access signal CS_EEP, CS_PROM, or CS_RAM for selecting a memory for performing the operation. The plurality of memories may be non-volatile memories such as an EEPROM 13 and a ROM 15, and a volatile memory such as a RAM 17.

A logic circuit 19 receives the plurality of memory access signals CS_EEP, CS_PROM, and CS_RAM, and outputs a control signal AS1 having a first level, e.g., a low level, when at least one of the plurality of memory access signals CS_EEP, CS_PROM, and CS_RAM is enabled.

The transistor MP1 turned on in response to the control signal AS1 having the first level pulls-up the voltage of an output node N2 to the first voltage VDD. Accordingly, the photo sensing cell 30 starts sensing an abnormal operation, e.g., a hacking attack, which can occur during at least one of the operations among the EEPROM 13, the ROM 15, and the RAM 17, e.g., a writing operation or a reading operation. The logic circuit 19 may be embodied in a NOR gate, however, it is not restricted thereto. The system may further include an inverter (not shown) inverting the voltage of the output node N2.

Figure 3:
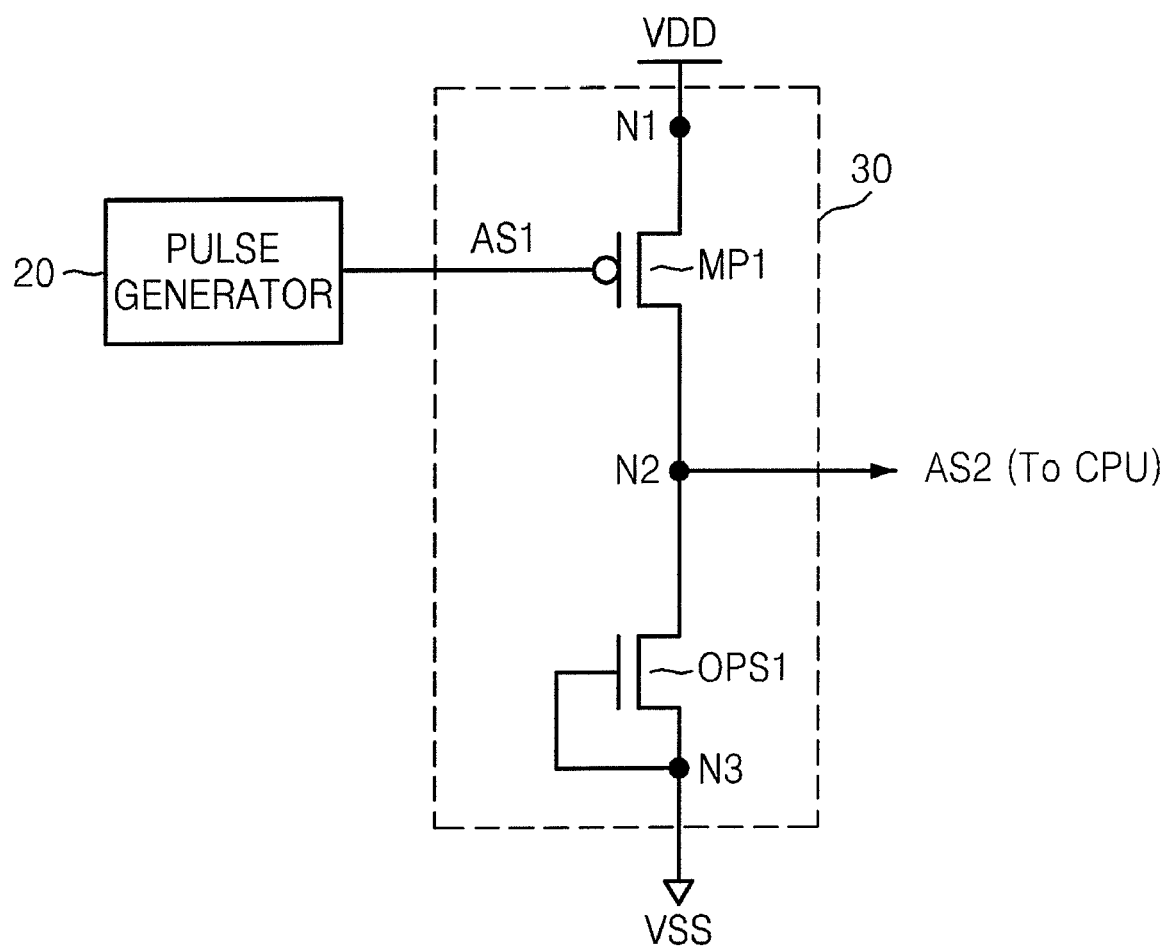
FIG. 3 is a system block diagram including the photo sensing cell illustrated in FIG. 1 and a peripheral circuit, according to an exemplary embodiment of the present invention.

FIG. 3 is a system block diagram including the photo sensing cell 30 illustrated in FIG. 1 and a peripheral circuit. Referring to FIG. 3, a system like a memory card includes a photo sensing cell 30 and a pulse generator 20. The pulse generator 20 generates a periodic pulse signal at a predetermined time interval. The pulse signal may be a pulse signal generated during a specific operation, e.g., a reading operation or a writing operation, and is used as the control signal AS1.

The transistor MP1 may pull-up the voltage of the output node N2 to the first voltage VDD periodically in response to a control signal having a first level.

Accordingly, the photo sensing cell 30 may sense an abnormal operation, e.g., a hacking attack, by pulling-up the voltage of the output node N2 to the first voltage VDD periodically in response to the control signal AS1. For example, the voltage AS2 of the output node N2, which is pulled-up to the first voltage VDD during an abnormal operation, is pulled-down to the second voltage VSS by the photo sensing element OPS1. In this case, the voltage of the output node N2 may be supplied to the CPU as a reset signal resetting the CPU (not shown).

The system may further include an inverter (not shown) inverting the voltage of the output node N2. In this case, an output voltage of the inverter may be supplied to the CPU as a reset signal resetting the CPU (not shown).

Figure 4:
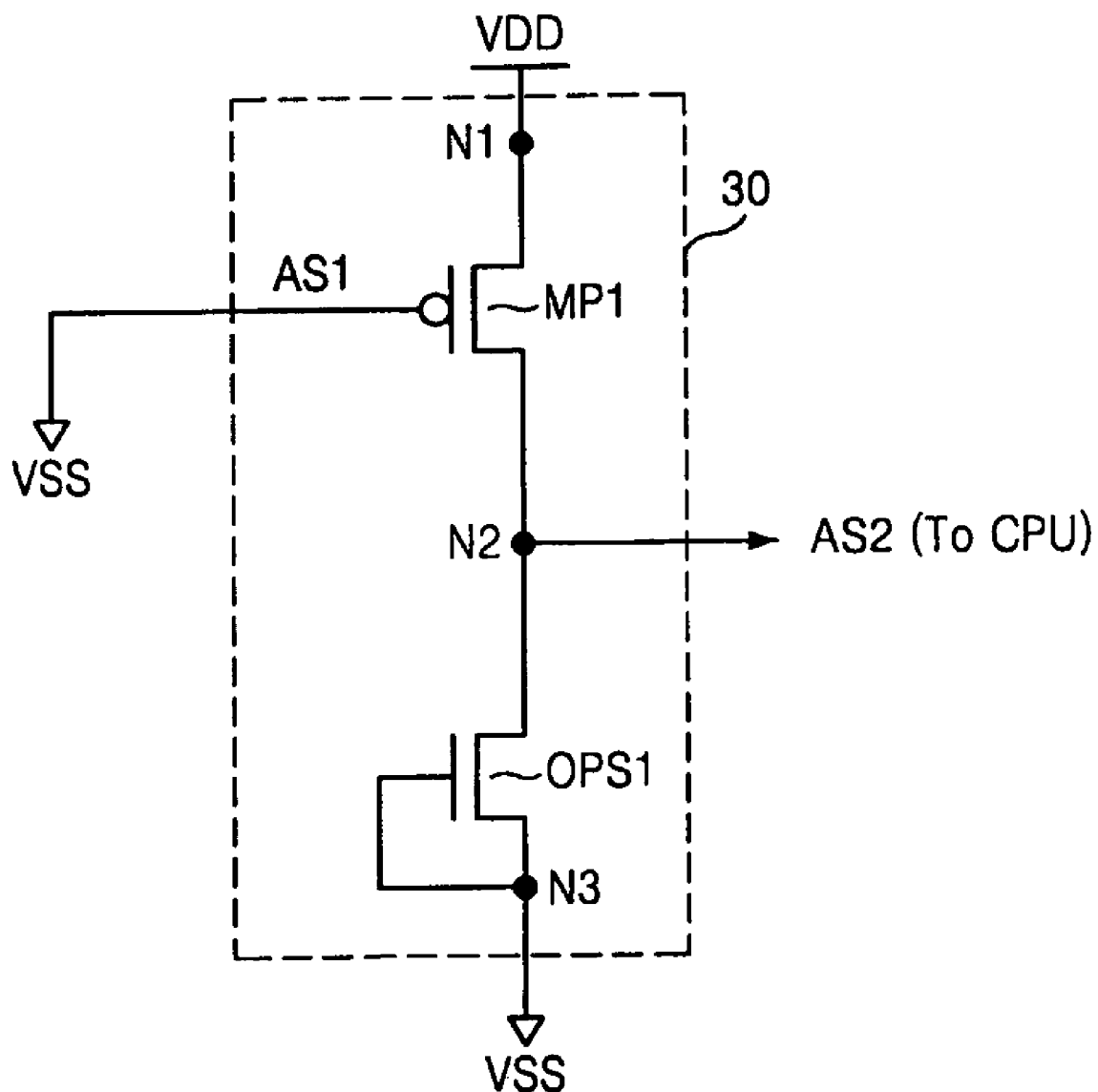
FIG. 4 is a system block diagram including the photo sensing cell illustrated in FIG. 1 and a peripheral circuit, according to an exemplary embodiment of the present invention.

FIG. 4 is a system block diagram including the photo sensing cell 30 illustrated in FIG. 1 and a peripheral circuit. When the pull-up unit 33 is embodied as a PMOS transistor, a gate of the PMOS transistor MP1 may be connected to the second voltage VSS, e.g., the second node N3 where a ground voltage is supplied. However, when the pull-up unit 33 is embodied as a NMOS transistor, a gate of the NMOS transistor may be connected to the first node N1 where the first voltage VDD is supplied. In this case, the PMOS transistor or the NMOS transistor is always turned on.

When the control signal AS1 has a first level, e.g., a low level (ground level), the photo sensing cell 30 keeps a voltage of the output node N2 at the first voltage VDD during normal operation. However, when the photo sensing element OPS1 is turned on in response to an incident light perceived from outside, a voltage of the output node N2 having the first voltage VDD is changed to the second voltage VSS. For example, when the output node N2 keeps the first voltage VDD, the photo sensing cell 30 outputs the first voltage VDD as the photo sensing signal AS2 at a normal operation. When the output node N2 keeps the second voltage VSS, the photo sensing cell 30 outputs the second voltage VSS output when an abnormal operation is sensed as the photo sensing signal AS2.

That is, when the control signal AS1 has a second level, e.g., a high level, the photo sensing signal AS2 output from the output node N2 may have a different output value according to a voltage which the output node N2 has when a previous abnormal operation is sensed.

In this case, as illustrated in FIG. 4, a photo sensing cell 30 may sense an abnormal operation regardless of a specific operation, e.g., a memory access operation such as reading or writing, by connecting a gate of the transistor MP1 to the second voltage VSS. As described above, the photo sensing cell 30 may always sense an abnormal operation in response to the control signal AS1 at memory accessing time, at a specific operation time, or regardless of a specific operation.

Figure 5:
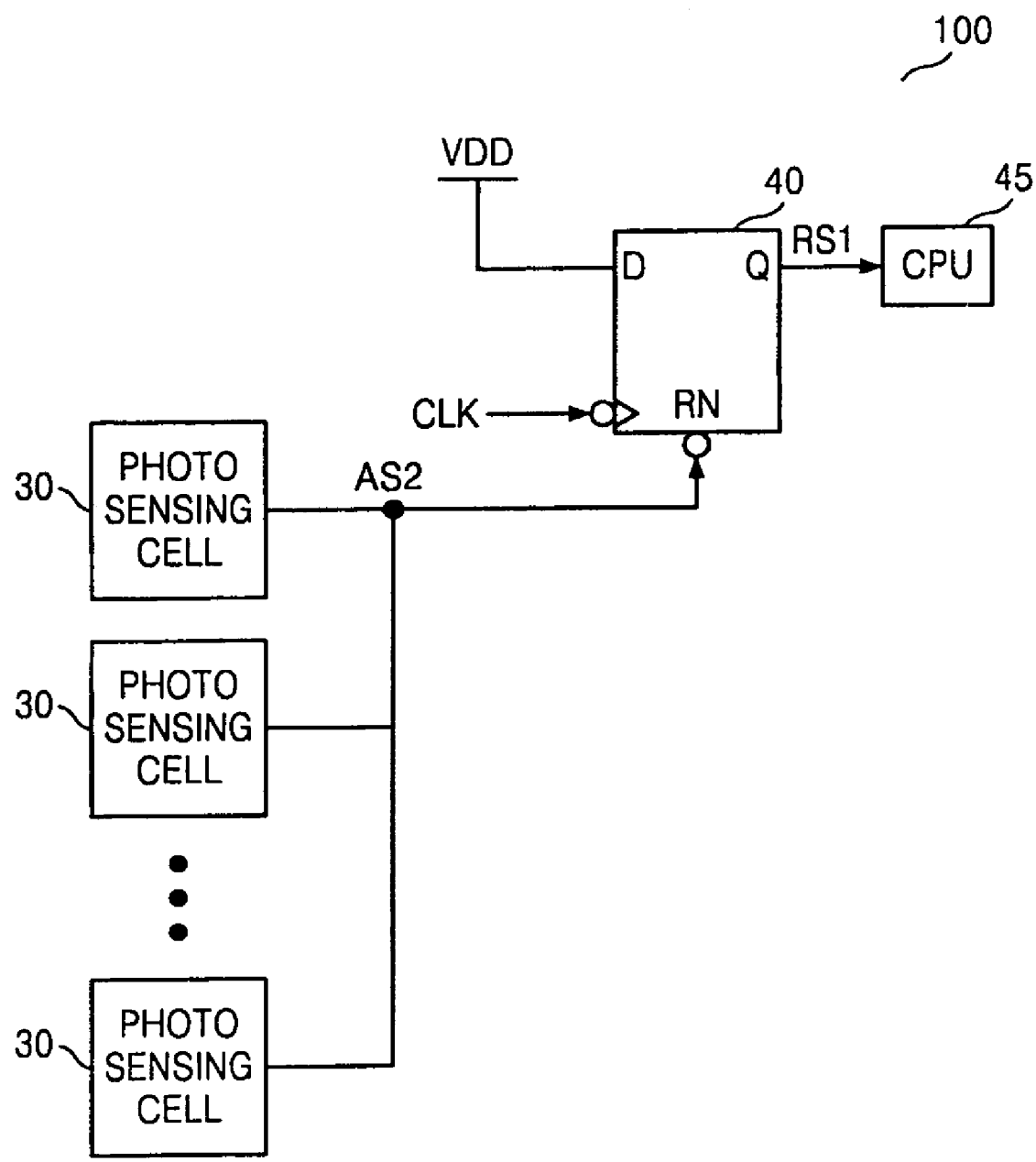
FIG. 5 is a block diagram of a memory card, according to an exemplary embodiment of the present invention.

FIG. 5 is a block diagram of a memory card according to an exemplary embodiment of the present invention. A memory card 100 includes a plurality of photo sensing cells 30, a latch 40, and a CPU 45 controlling the operation of a memory (not shown) storing data, which requires security. The plurality of the photo sensing cells 30 respectively senses an abnormal operation in response to the control signal AS1 as described above.

The latch 40 may be reset in response to the photo sensing signal AS2 output by at least one of the plurality of photo sensing cells 30 in response to an abnormal operation, and latch the first voltage VDD (high level or data "1") in response to a clock signal CLK. The latch 40 outputs the first voltage VDD (high level or data "1") as a reset signal RS1 resetting the CPU 45 in response to the clock signal CLK. The latch 40 may be embodied in a flip-flop. The CPU 45 is reset in response to the reset signal RS1. After being reset, the CPU 45 may perform at a normal operation.

Accordingly, the memory card 100 according to an exemplary embodiment of the present invention, by including the photo sensing cell 30 illustrated in FIGS. 2 and 4, may reset the CPU 45 controlling the operation of a memory (not shown) storing data requiring security when the photo sensing cell 30 senses an abnormal operation, thereby protecting data stored in the memory.

Figure 6:
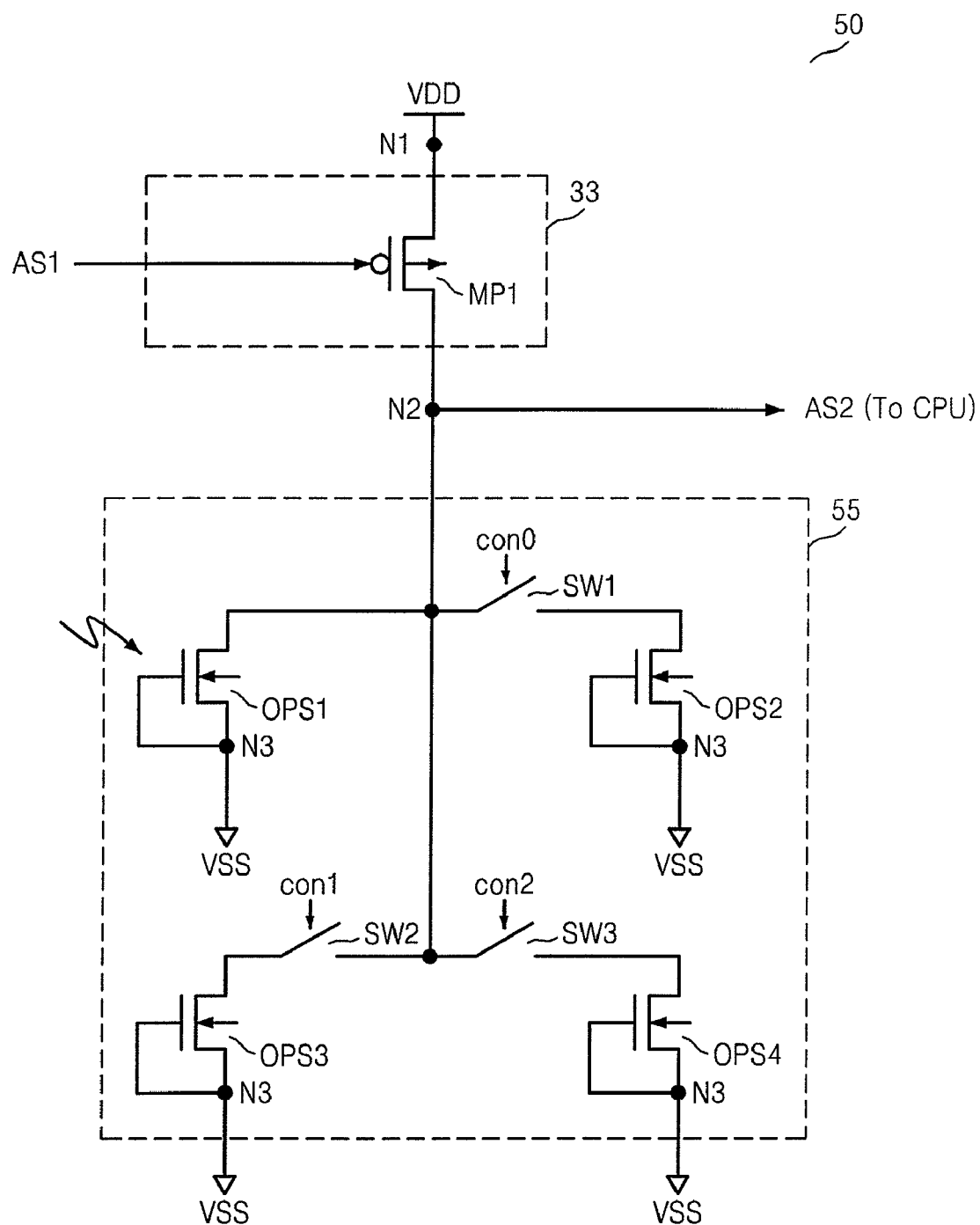
FIG. 6 is a circuit diagram of a photo sensing cell, according to an exemplary embodiment of the present invention.

FIG. 6 is a circuit of a photo sensing cell according to an exemplary embodiment of the present invention. The photo sensing cell 50 includes the pull-up unit 33 and a photo sensing unit 55. As described in FIG. 1, the pull-up unit 33 includes the transistor MP1, and the transistor MP1 is connected between the first node N1 receiving the first voltage VDD and the output node N2. The pull-up unit 33 turns on the transistor MP1 in response to the control signal AS1, and pulls-up a voltage of the output node N2 to the first voltage VDD by forming a current channel between the first node N1 and the output node N2.

The control signal AS1 may be the output signal of the logic circuit 19 of FIG. 2, the pulse signal generated by the pulse generator 20 of FIG. 3, or the second voltage VSS. A photo sensing unit 55 includes a plurality of photo sensing elements OPS1, OPS2, OPS3, and OPS4, and a plurality of switches SW1, SW2, and SW3. A first photo sensing element OPS1 is connected between the output node N2 and the second node N3 receiving the second voltage VSS. At an abnormal operation, the first photo sensing element OPS1 pulls-down a voltage of the output node N2 to the second voltage VSS in response to an incident light perceived from outside.

The plurality of photo sensing elements OPS2, OPS3, and OPS4, respectively, are connected between the output node N2 and the second node N3 through a corresponding switch among the plurality of switches SW1, SW2, and SW3. The plurality of the switches SW1, SW2, and SW3 are respectively turned on/off in response to a corresponding switch control signal among a plurality of switch control signals con0, con1, and con2. The plurality of the switches SW1, SW2, and SW3 respectively are normally open, and are closed in response to the corresponding switch control signals con0, con1, and con2.

Each of the switch control signals con0, con1, and con2 is output from a signal generator (not shown) in order. The signal generator stores a processing program, instructions, and data generating switch signals con0, con1, and con2 for controlling the plurality of switches SW1, SW2, and SW3. When a photo sensing element OPS1 senses an incident light perceived from outside, the voltage AS2 of the output node N2 pulled-up to the first voltage VDD is pulled-down to the second voltage by the photo sensing element OPS1.

When an incident light is less intense, the photo sensing element OPS1 requires a lot of time to pull down the voltage AS2 of the output node N2 to the second voltage VSS. Accordingly, the photo sensing unit 55 uses the plurality of photo sensing elements OPS2, OPS3, and OPS4 to pull down the voltage of the output node N2 to the second voltage VSS faster.

When an incident light is less intense at the time of sensing an abnormal operation, the signal generator generates switch control signals con0, con1, and con2 in order or at the same time. The plurality of switches SW1, SW2, and SW3 are respectively closed in response to a corresponding switch control signal con0, con1, and con2. Accordingly, the voltage AS2 of the output node N2 may be pulled-down faster to the second voltage VSS by using the plurality of photo sensing elements OPS1, OPS2, OPS3, and OPS4.

The number of photo sensing elements OPS2, OPS3, and OPS3, and switches SW1, SW2, and SW3 may be changed. As the number of photo sensing elements increases, the photo sensing cell 50 may sense an abnormal operation faster even when an incident light is less intense. Also, the photo sensing cell 50 or the photo sensing element OPS1 may be arranged in a small space in a memory card. Accordingly, the photo sensing cell 50 or the photo sensing element OPS1 may detect an abnormal operation in an entire area of a chip of a memory card.

Although exemplary embodiments of the present invention have been shown and described, it will be appreciated by those skilled in the art that various modifications, additions, and substitutions are possible without departing from the scope and spirit of the disclosure.

What is claimed is:

1. A semiconductor device comprising:
   a pull-up unit connected between a first node receiving a first voltage and an output node, the pull-up unit pulls up a voltage of the output node to the first voltage in response to a control signal;
   a photo sensing unit connected between the output node and a second node receiving a second voltage, the photo sensing unit pulls down the voltage of the output node to the second voltage in response to an incident light; and
   a CPU, wherein the CPU is reset in response to the voltage of the output node generated in response to the incident light.

2. The semiconductor device of claim 1, further comprising:
   a memory storing data; and a controller controlling operation of the memory, wherein the control signal is a memory access signal output from the controller to access the memory.

3. The semiconductor device of claim 1, further comprising a pulse generator generating the control signal as a periodic pulse.

4. The semiconductor device of claim 1, wherein the pull-up unit comprises a MOS transistor connected between the first node and the output node, and a gate of the MOS transistor receives the control signal and is connected to one of the first node or the second node.

5. The semiconductor device of claim 1, wherein the photo sensing unit comprises a plurality of photo sensing elements connected between the output node and the second node via a plurality of switches, and
wherein the plurality of switches turn on/off in response to a plurality of switch control signals.

6. The semiconductor device of claim 1, wherein the semiconductor device is a memory card.

7. A semiconductor device comprising:
a pull-up unit connected between a first node receiving a first voltage and an output node, the pull-up unit pulls up a voltage of the output node to the first voltage in response to a control signal;
a photo sensing unit connected between the output node and a second node receiving a second voltage, the photo sensing unit pulls down the voltage of the output node to the second voltage in response to an incident light:
a latch, which is reset in response to the voltage of the output node generated in response to the incident light, and the latch latches data corresponding to the first voltage in response to a clock signal; and
a CPU, wherein the CPU is reset in response to data output from the latch.

8. A CPU reset method for resetting a CPU controlling an operation of a memory storing data, the method comprising:
pulling-up a level of a photo sensing signal to a first voltage level in response to a control signal;
pulling-down a level of the photo sensing signal to a second voltage level, lower than the first voltage level, in response to an incident light; and
resetting the CPU in response to the photo sensing signal having the second voltage level.

9. The method of claim 8, wherein the control signal is a memory access signal accessing the memory.

10. The method of claim 8, wherein the control signal is a periodic pulse signal.

11. The method of claim 8, wherein the control signal is the second voltage.

12. A memory card comprising:
a memory storing data;
a controller controlling operation of the memory;
a photo sensing cell; and
a CPU resetting by a second voltage of the output node generated in response to an incident light,
wherein the photo sensing cell includes:
a pull-up unit connected between a first node receiving a first voltage and an output node, the pull-up unit pulls up a voltage of the output node to the first voltage in response to a control signal; and
a photo-sensing unit connected between the output node and a second node receiving a second voltage, the photo-sensing unit pulls down the voltage of the output node to the second voltage in response to the incident light.

13. The memory card of claim 12, wherein the control signal is a memory access signal output from the controller for accessing the memory.

14. The memory card of claim 13, wherein the memory includes an EEPROM, a ROM, and a RAM.

15. The memory card of claim 14, wherein the memory access signal includes an EEPROM access signal, a ROM access signal, and a RAM access signal.

16. The memory card of claim 12, wherein the photo sensing cell includes a plurality of photo-sensing units.

17. The memory card of claim 16, wherein the plurality of photo-sensing units are connected to the output node via a plurality of switches.

18. The memory card of claim 12, wherein the memory is a flash EEPROM.

19. The memory card of claim 16, further comprising a pulse generator generating the control signal as a periodic pulse.

* * * * *